No. 668,540. Patented Feb. 19, 1901.
O. P. OSTERGREN.
REFRIGERATING AND PUMPING ENGINE.
(Application filed May 4, 1900.)
(No Model.) 3 Sheets—Sheet 1.

WITNESSES
L. Almquist
C. Sedgwick

INVENTOR
Oscar P. Ostergren
by A. P. Thayer
ATTY

No. 668,540. Patented Feb. 19, 1901.
O. P. OSTERGREN.
REFRIGERATING AND PUMPING ENGINE.
(Application filed May 4, 1900.)
(No Model.) 3 Sheets—Sheet 2.
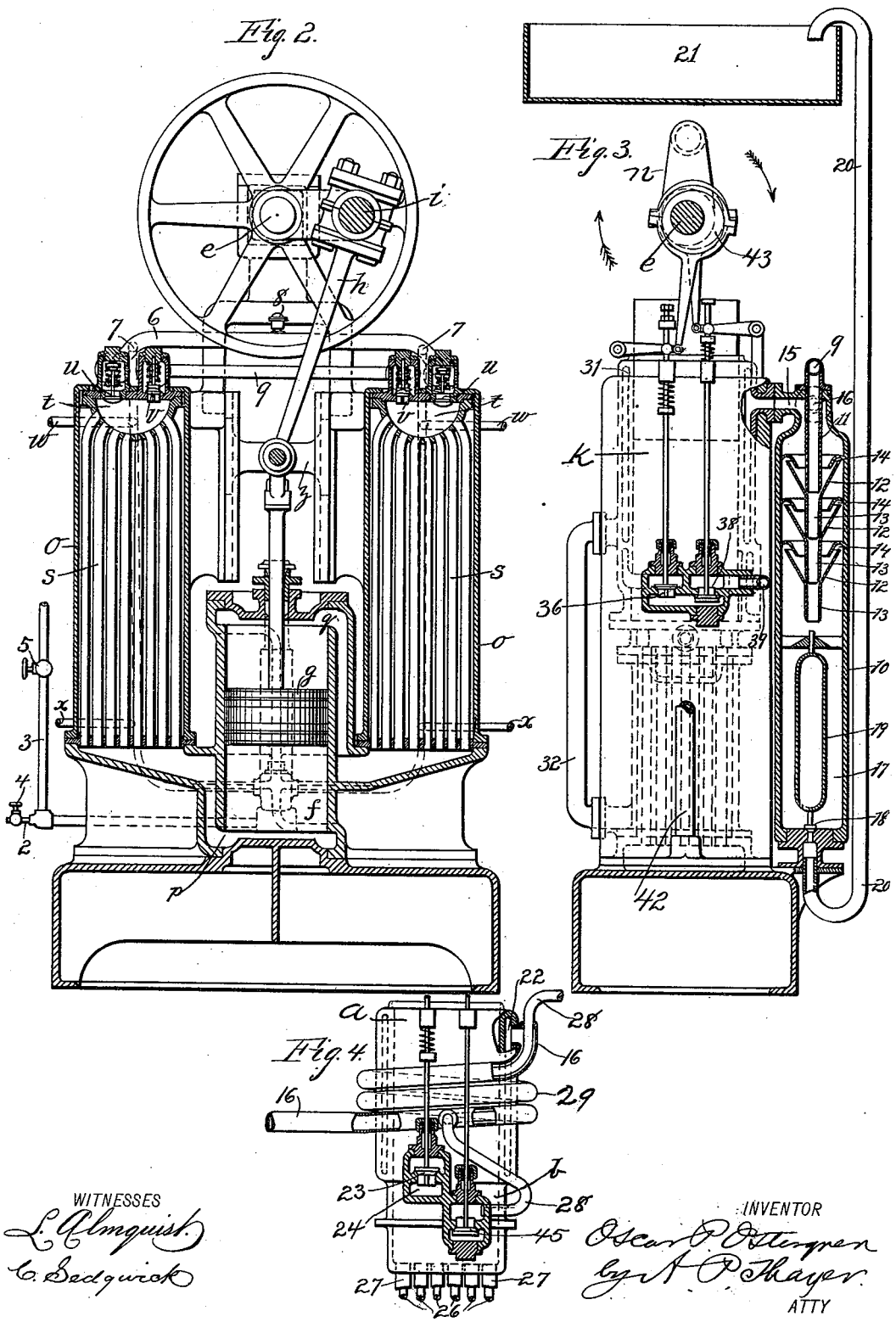

No. 668,540. Patented Feb. 19, 1901.
O. P. OSTERGREN.
REFRIGERATING AND PUMPING ENGINE.
(Application filed May 4, 1900.)
(No Model.) 3 Sheets—Sheet 3.

WITNESSES
L. Almquist
C. Sedgwick

INVENTOR
Oscar P. Ostergren
Wm. P. Thayer
ATTY

UNITED STATES PATENT OFFICE.

OSCAR P. OSTERGREN, OF BEDFORD PARK, NEW YORK, ASSIGNOR TO THE OSTERGREN MANUFACTURING COMPANY, OF NEW JERSEY.

REFRIGERATING AND PUMPING ENGINE.

SPECIFICATION forming part of Letters Patent No. 668,540, dated February 19, 1901.

Application filed May 4, 1900. Serial No. 15,457. (No model.)

*To all whom it may concern:*

Be it known that I, OSCAR P. OSTERGREN, a subject of the King of Sweden and Norway, and a resident of Bedford Park, borough of Bronx, New York city, in the State of New York, have invented certain new and useful Improvements in Refrigerating and Pumping Engines, of which the following is a specification.

My invention consists of a hot-air engine, air-compressor, a compressed-air expanding and cooling engine, and a refrigerating-radiator; also, means for raising water combined in a novel manner for refrigerating and for pumping or raising water, together with improvements in details and adjuncts of some of the parts, as hereinafter described, reference being made to the accompanying drawings, in which—

Figure 1:
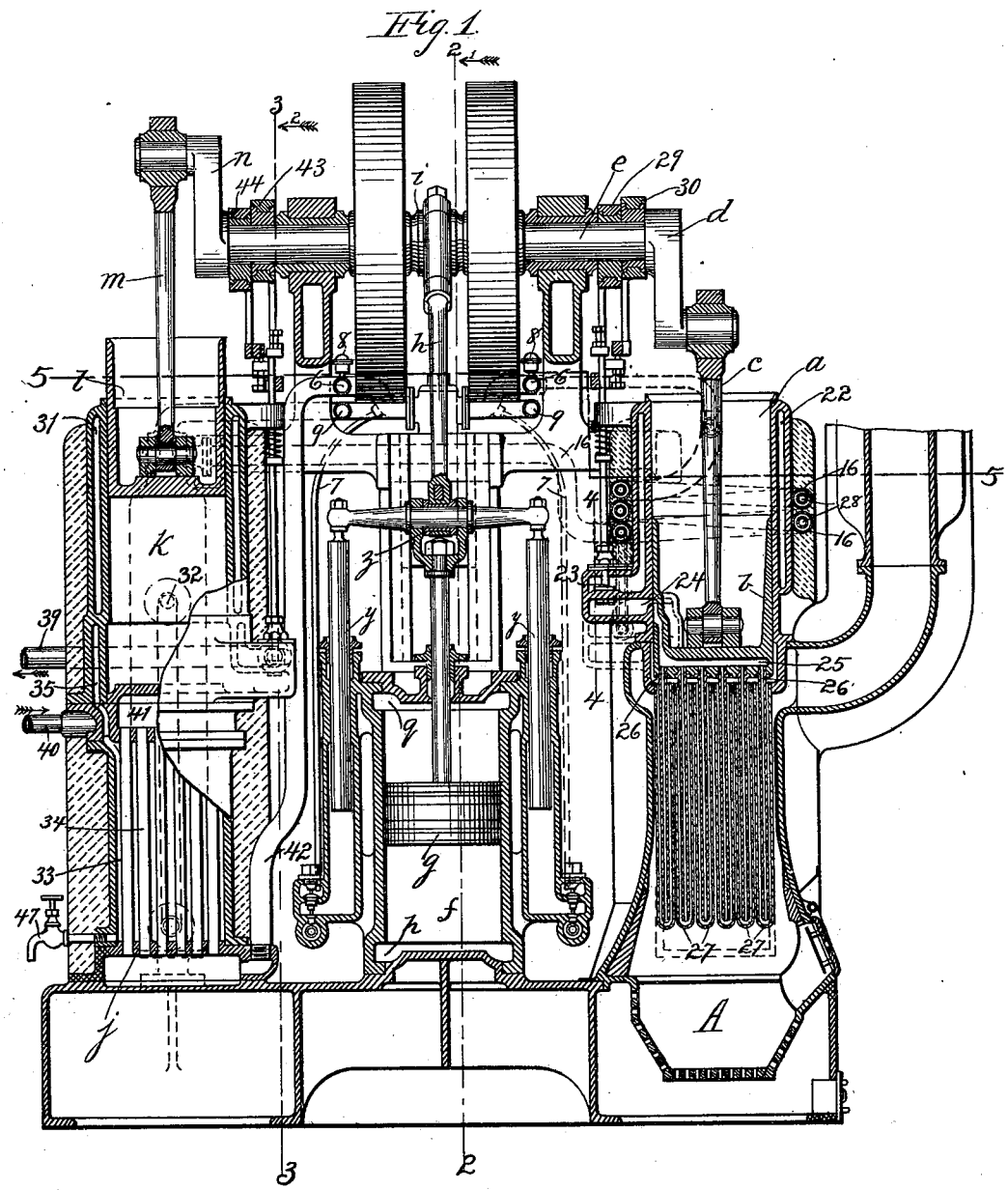
Figure 5:
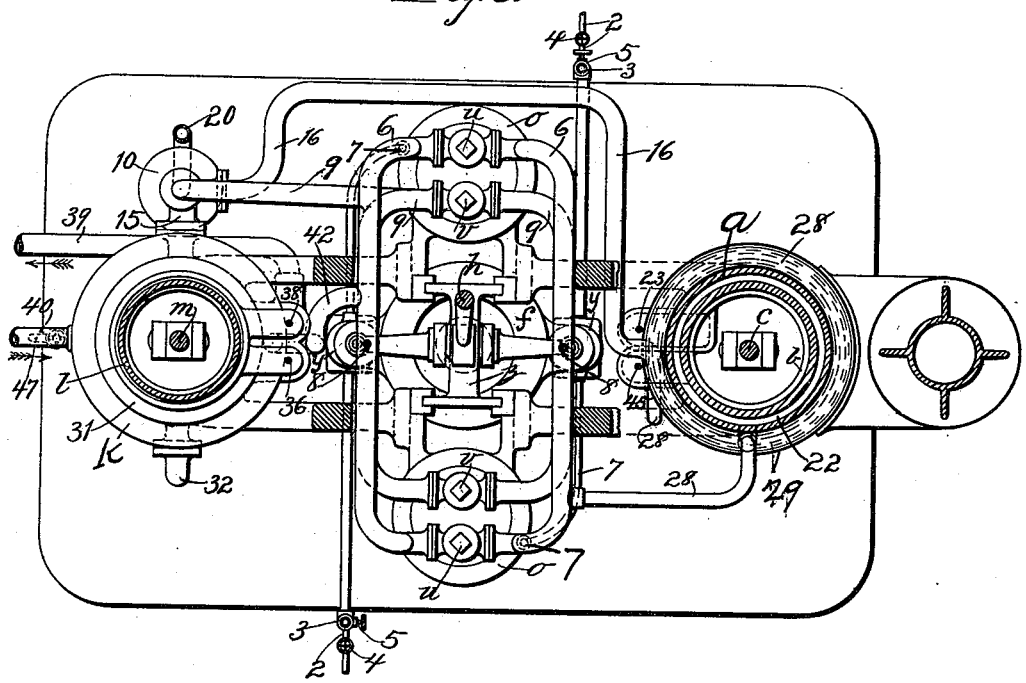
Figure 6:
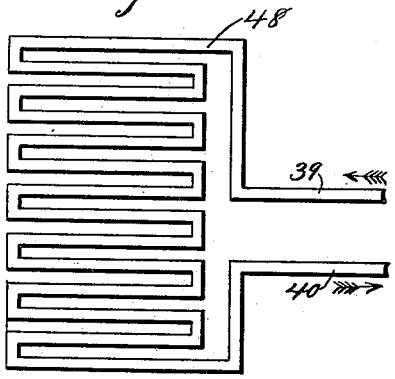

Figure 1 is a vertical section of the apparatus in the plane of the main shaft, the hot-air engine, air-compressing pump, feed-pump, and the air expanding and cooling engine, all connected to said shaft. Fig. 2 is a central transverse vertical section on line 2 2 through the air-compressing pump and chambers of the air-compressor. Fig. 3 is a side elevation of the air expanding and cooling engine and section of the main shaft and valves of said engine on line 3 3 of Fig. 1; also, a section of the trap for separating the water from the compressed air and elevating it, said trap being in Fig. 1 indicated in dotted lines behind the air expanding and cooling engine. Fig. 4 is a detail of the valves of the hot-air engine in side elevation, with some parts broken out, and section of the valves on line 4 4, Fig. 1. Fig. 5 is a horizontal section on line 5 5 of Fig. 1. Fig. 6 is a diagram of the radiator.

A represents the furnace, $a$ the cylinder, and $b$ the piston, of a hot-air engine, of which said piston $b$ is connected by the rod $c$ and crank $d$ with the main shaft $e$.

$f$ is the cylinder, and $g$ the piston, of an air-compressing pump for supplying compressed air to the hot-air engine and the expanding-engine, said piston being connected by the rod $h$ and crank $i$ with the main shaft.

$j$ is a precooler.

$k$ is the cylinder, and $l$ the piston, of the air expanding and cooling engine, said piston being connected by a rod $m$ and crank $n$ to said main shaft $e$.

The power developed in the hot-air and the expanding engines operates the compressor for supplying compressed air. The compressor will therefore be first described. Besides the cylinder $f$ and piston $g$ the compressor comprises two compressing-chambers and coolers, consisting of the hollow upright cylinders $o$, which are in communication with cylinder $f$ through ports $p$ and $q$, respectively, and each has a multitude of tubes $s$ communicating with a chamber $t$ at the upper end, into which air enters through suction-valves $u$ and from which it is expelled through valves $v$, said tubes $s$ being surrounded by cooling-water entering through circulating-pipes $w$ and discharging through pipes $x$ to take away the heat or part of the heat generated by compression. The pump and these compressing-chambers are properly charged with water packing to expel all the air when eduction takes place and avoid any loss in clearance-spaces. The packing-water thus circulating in the air-spaces and the cooling-water surrounding the air-spaces of the compressing-chambers cool the air isothermally, which insures greater efficiency.

To maintain the desired full charge of air in the several parts of the apparatus and to supply the water to be raised, feed-pumps $y$ are connected to the cross-head $z$ of the air-compressing pumps, which receive water from the feed-pipes 2 and air from the atmosphere through pipes 3 together and are regulated as to the proper quantities of each by cocks 4 and 5 and discharged into the suction-pipes 6 of the compressor through pipes 7. A relief-valve 8 on the suction-pipe 6 allows escape of air and prevents excessive pressure on the suction side of the compressor.

The compressed air expelled from the compressor and excess of water are discharged through pipe 9 into a trap for separating the water from the air and drying it for more effective expansion of the air in the hot-air engine. The trap consists of the upright hollow cylinder 10, into the top of which pipe 9 enters with a downward extension 11 therein, which discharges into the throat of a funnel 12, which has a nozzle 13 discharging into the throat of another funnel 12, and so on through other like funnels and nozzles, as many as desired, for injecting the heavier aqueous vapor downward, while the air freed of the moisture rises upward around the upper ends of funnels 12 and is deflected over them by other funnels 14, so as to direct any further moisture downward for more effective separation, and finally rises to the discharge-pipes 15 and 16. The water falls into the lower part 17 of cylinder 10, from which, by the aid of a valve 18, controlled by a float 19, and a stand-pipe 20, the water is discharged by the pressure of air upon it into an elevated receiving-tank 21. Through the discharge-pipe 16 of the trap part of the dry air from the separating-trap goes to the jacket 22 of the hot-air engine, from which the inlet-valve 23 admits it through port 24 into chamber 25 of piston $b$, which in the lower part of the stroke of the piston registers with said port 24, and thus receives a charge of dry compressed air to be expanded. The piston $b$ has a multitude of tubes 26 extending downward from chamber 25 and discharging into other tubes 27, extending into the furnace-chamber and absorbing heat therefrom. They are closed at the lower ends, so that the air discharging into them from tubes 26 and being heated and expanded rises into cylinder $a$ under piston $b$, forcing it upward with impelling effect on the crank and at the same time being heated by tubes 27 and also by tubes 26, which rise in cylinder $a$ with the piston, whereby the air having absorbed all available heat and become isothermally heated, together with the isothermal compression of the air, a very great percentage of the efficiency of the fuel is obtained. The air having thus become heated and having done its work is exhausted through valve 45 and pipe 28 to the suction-valves of the compressor, said pipe being arranged inside of pipe 16, leading the compressed air from the trap to the engine, and the two pipes being arranged in a coil 29 and said coil located around the jacket 22 of hot-air cylinder $a$ for heating the ingoing and cooling the outgoing air passing in opposite directions the outgoing air is thereby lowered to the same temperature as that of the air leaving the compressor, or practically so, while the ingoing air, on the other hand, gains all that heat before going into the hot-air cylinder. The valves 23 and 45 are controlled by the eccentrics 29 and 30, respectively. The other part of the dry air from the trap enters through passage 15 into the jacket 31 of expanding cylinder $k$, and therefrom goes through pipe 32 into chamber 33 of a precooler to said expanding cylinder, in which chamber it passes upward around the multitude of tubes 34 into jacket 35 and through inlet-valve 36 into cylinder $k$ under piston $l$, forcing it upward with impelling effect on crank $n$ and shaft $e$ and at the same time cooling preparatory to refrigerating action in a radiator 48, to which it exhausts through valve 38 and pipe 39 and from which the air returns through pipe 40 into the chamber 41 and through tubes 34 into the pipe 42, leading back to the suction-valves of the compressor. Any water that may be deposited from the air in chamber 33 may be drawn off from time to time by the cock 47.

The valves 36 and 38 are controlled by the eccentrics 43 and 44, respectively. The points of cut off of these valves and of valves 23 and 45 of the hot-air engine determine the pressure on the high-pressure side of the system and the relief-valves 8 determine the pressure on the suction side, as before stated.

While it is advantageous to return the air exhausting from the hot-air engine and also from the cold-air engine back into the compressor as a means of economizing the remaining compression thereof and the drier condition of the same, it is not essential to successful economical operation of the apparatus, and I do not limit myself to such conditions and mode of operation, but will when desirable adapt the apparatus for exhausting either or both of these engines directly into the atmosphere.

After fire has been started in the furnace A the crank-shaft is turned by external force, as by hand, for starting the engine until enough air is accumulated by the feed-pumps $y$, whereby the combined energy of the hot-air cylinder and the expansion and cooling cylinder is greater than the resistance of the compressor and the friction of the mechanism, after which the engine will run by its own force. The pressure needed for starting can be supplied by a hand-pump if desired. When the desired pressure on the suction side is reached, which will be indicated by the relief-valves 8, the supply of atmospheric air may be regulated by cock 5 and the supply of cooling-water may be regulated by cock 4, so that the water leaves the compressed air at the desired temperature. This method of refrigeration is, theoretically, ideal, as the air is compressed without accumulation of heat and expanded in the hot-air cylinder with a constant supply of heat and the heat of the exhausted and expanded air returned to the cylinder again in the new ingoing air, and also as the air in the cold-air cylinder expands without any other supply of heat than that which is taken up from the cylinder-wall and that wall is surrounded by air that is to enter the cylinder it must be seen that with the exception of such power as is expended in friction and the small amount carried away by the cooling-water every foot pound of energy is turned into effective work in refrigeration and water elevating, and as the heating-surfaces of the hot-air engine can be made comparatively large the efficiency of this engine is great proportionately to its size.

As a refrigerating plant only, the water-elevating part of the apparatus may be omitted, except it will be desirable, though not essential, to employ the trap for separating moisture from the air, which may be drawn off at the bottom of the trap through a cock from time to time. In such case the cooling of the compressing-chambers will be effected by water circulating through cylinders o by pipes w x and supplied in any approved way, and the pumps y will be used only for replenishing the compressing-chambers with air and water as waste occurs.

I do not claim herein the foregoing specific construction of the hot-air engine.

What I claim as my invention is—

1. The combination in refrigerating apparatus, of means for compressing and cooling air, a hot-air engine receiving compressed air from the compressor, and geared with the compressor for operating it, a cold-air-expanding engine also receiving compressed air from the compressor and geared with said compressor for operating it, a refrigerating-radiator and means for exhausting the expanded air from the cold-air engine through the radiator.

2. The combination in a refrigerating apparatus, of means for compressing and cooling air, a hot-air engine receiving compressed air from the compressor, and geared with the compressor for operating it, a water-separating trap through which the compressed air passes to the hot-air engine, a cold-air-expanding engine, also receiving compressed air through said trap, and geared with the compressor for operating it, a refrigerating-radiator and means for exhausting the expanded air from the cold-air engine through the radiator.

3. The combination in refrigerating apparatus, of means for compressing and cooling air, a hot-air engine receiving compressed air from the compressor and geared with the compressor for operating it, means for replenishing the air in the compressor and regulating the pressure therein, a cold-air-expanding engine also receiving compressed air from the compressor, and geared with the compressor for operating it, a refrigerating-radiator, and means for exhausting the expanded air from the cold-air engine through the radiator.

4. The combination in refrigerating apparatus, of means for compressing and cooling air, a hot-air engine receiving compressed air from the compressor, and geared with the compressor for operating it, a preheater for the air entering said engine adapted to be heated by the exhausting air from the engine, a cold-air-expanding engine also receiving air from the compressor, and geared with the said compressor for operating it, a refrigerating-radiator, and means for exhausting the expanded air from the cold-air engine through the radiator.

5. The combination in refrigerating apparatus, of means for compressing and cooling air, consisting of a compressing-pump, cooling and compressing chambers and a water packing therein, a hot-air engine receiving compressed air from the compressor, and geared with the compressor for operating it, a cold-air-expanding engine also receiving compressed air from the compressor and geared with said compressor for operating it, a refrigerating-radiator, means for exhausting the expanded air from the cold-air engine through the radiator, means for replenishing the compressing-chambers with water and air and means for separating the excess of water from the air.

6. The combination in refrigerating apparatus, of means for compressing and cooling air, a hot-air engine receiving compressed air from the compressor and geared with the compressor for operating it, a water-separating trap through which the compressed air passes to the hot-air engine, a cold-air-expanding engine also receiving compressed air through the trap, and geared with the compressor for operating it, a refrigerating-radiator, means for exhausting the expanded air from the cold-air engine through the radiator, and means for elevating the water deposited in the trap by the hydrostatic pressure in the trap.

7. The combination in refrigerating apparatus, of means for compressing and cooling air, a hot-air engine receiving compressed air from the compressor, and geared with the compressor for operating it, a cold-air-expanding engine also receiving compressed air from the compressor and geared with said compressor for operating it, a precooler for the air entering said cold-air engine, a refrigerating-radiator, and means for exhausting the expanded air back through the refrigerator and precooler.

8. The combination in refrigerating apparatus, of means for compressing and cooling air, consisting of a compressing-pump, compressing and cooling chambers and a water packing therein, a hot-air engine receiving compressed air from the compressor and geared with the compressor for operating it, a cold-air-expanding engine also receiving compressed air from the compressor and geared with said compressor for operating it, a refrigerating-radiator, means for exhausting the expanded air from the cold-air engine through the radiator, means for replenishing the compressing-chambers with water and air, means for separating the excess of water from the air, and means for elevating the separated water by the hydrostatic pressure in the separating-trap.

9. The combination in refrigerating apparatus, of means for compressing and cooling air, a hot-air engine receiving compressed air from the compressor, and geared with the compressor for operating it, means for returning the air exhausted from said engine to the compressor, a cold-air-expanding engine also receiving compressed air from the compressor and geared with said compressor for operating it, a refrigerating-radiator and means for returning the expanded air from the cold-air engine back to the compressor through the radiator.

10. The combination in a refrigerating apparatus, of means for compressing and cooling air, a hot-air engine receiving compressed air from the compressor, and geared with the compressor for operating it, means for returning the air exhausted from the engine to the compressor, a water-separating trap through which the compressed air passes to the hot-air engine, a cold-air-expanding engine, also receiving compressed air through said trap, and geared with the compressor for operating it, a refrigerating-radiator and means for returning the expanded air from the cold-air engine back to the compressor through the radiator.

11. The combination in refrigerating apparatus, of means for compressing and cooling air, a hot-air engine receiving compressed air from the compressor and geared with the compressor for operating it, means for returning the air exhausted from the engine to the compressor, means for replenishing the air in the compressor and regulating the pressure therein, a cold-air-expanding engine also receiving compressed air from the compressor, and geared with the compressor for operating it, a refrigerating-radiator, and means for returning the expanded air from the cold-air engine back to the compressor through the radiator.

12. The combination in refrigerating apparatus, of means for compressing and cooling air, a hot-air engine receiving compressed air from the compressor, and geared with the compressor for operating it, means for returning the air exhausted from the hot-air engine to the compressor, a preheater for the air entering said engine adapted to be heated by the exhausting air on its return to the compressor, a cold-air-expanding engine also receiving air from the compressor, and geared with the said compressor for operating it, a refrigerating-radiator, and means for returning the expanded air from the cold-air engine back to the compressor through the radiator.

13. The combination in refrigerating apparatus, of means for compressing and cooling air, consisting of a compressing-pump, cooling and compressing chambers and a water packing therein, a hot-air engine receiving compressed air from the compressor, and geared with the compressor for operating it, means for returning the air exhausted from the hot-air engine to the compressor, a cold-air-expanding engine also receiving compressed air from the compressor and geared with said compressor for operating it, a refrigerating-radiator, means for returning the expanded air from the cold-air engine back to the compressor through the radiator, means for replenishing the compressing-chambers with water and air and means for separating the excess of water from the air.

14. The combination in refrigerating apparatus, of means for compressing and cooling air, a hot-air engine receiving compressed air from the compressor and geared with the compressor for operating it, means for returning the air exhausted from the engine back to the compressor, a water-separating trap through which the compressed air passes to the hot-air engine, a cold-air-expanding engine also receiving compressed air through the trap, and geared with the compressor for operating it, a refrigerating-radiator, means for returning the expanded air from the cold-air engine back to the compressor, and means for elevating the water deposited in the trap by the hydrostatic pressure in the trap.

15. The combination in refrigerating apparatus, of means for compressing and cooling air, a hot-air engine receiving compressed air from the compressor, and geared with the compressor for operating it, means for returning the air exhausted from said engine to the compressor, a cold-air-expanding engine also receiving compressed air from the compressor and geared with said compressor for operating it, a precooler for the air entering said cold-air engine, a refrigerating-radiator, and means for returning the expanded air back through the refrigerator and precooler to the compressor.

16. The combination in refrigerating apparatus, of means for compressing and cooling air, consisting of a compressing-pump, compressing and cooling chambers and a water packing therein, a hot-air engine receiving compressed air from the compressor and geared with the compressor for operating it, means for returning the air exhausted from the hot-air engine to the compressor, a cold-air-expanding engine also receiving compressed air from the compressor and geared with said compressor for operating it, a refrigerating-radiator, means for returning the expanded air from the cold-air engine back to the compressor through the radiator, means for replenishing the compressing-chambers with water and air, means for separating the excess of water from the air, and means for elevating the separated water by the hydrostatic pressure in the separating-trap.

Signed by me at New York, N. Y., this 30th day of March, 1900.

OSCAR P. OSTERGREN.

Witnesses:
A. P. THAYER,
C. SEDGWICK.